US012585155B2

(12) United States Patent
Zhang et al.

(10) Patent No.: US 12,585,155 B2
(45) Date of Patent: Mar. 24, 2026

(54) BACKLIGHT PANEL

(71) Applicant: WUHAN CHINA STAR OPTOELECTRONICS TECHNOLOGY CO., LTD., Wuhan (CN)

(72) Inventors: Ze Zhang, Wuhan (CN); Lei Zhu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/247,602

(22) PCT Filed: Feb. 28, 2023

(86) PCT No.: PCT/CN2023/078885
§ 371 (c)(1),
(2) Date: Jan. 14, 2025

(87) PCT Pub. No.: WO2024/130847
PCT Pub. Date: Jun. 27, 2024

(65) Prior Publication Data
US 2025/0138363 A1     May 1, 2025

(30) Foreign Application Priority Data
Dec. 22, 2022    (CN) .......................... 202211657431.6

(51) Int. Cl.
*G02F 1/13357*        (2006.01)

(52) U.S. Cl.
CPC .............................. *G02F 1/133603* (2013.01)

(58) Field of Classification Search
CPC ....................... G02F 1/133603; G09G 3/3426; H10H 29/49; H10H 29/34
See application file for complete search history.

(56) References Cited

U.S. PATENT DOCUMENTS

| | | | | |
|---|---|---|---|---|
| 11,842,701 | B1 * | 12/2023 | Wan | G09G 3/3426 |
| 11,886,059 | B1 * | 1/2024 | Wan | G02F 1/1323 |
| 2025/0221126 | A1 * | 7/2025 | Li | G09F 9/33 |

FOREIGN PATENT DOCUMENTS

| | | |
|---|---|---|
| CN | 101000125 A | 7/2007 |
| CN | 107153301 A | 9/2017 |

(Continued)

OTHER PUBLICATIONS

International Search Report in International application No. PCT/CN2023/078885, mailed on Aug. 29, 2023.

(Continued)

*Primary Examiner* — Abdulmajeed Aziz
*Assistant Examiner* — Jessica M Apenteng
(74) *Attorney, Agent, or Firm* — PV IP PC; Christopher S. Ruprecht; Wei Te Chung

(57) ABSTRACT

The embodiments of the present disclosure provide a backlight module. A first light-emitting diode and a second light-emitting diode are alternately arranged along a first direction and/or a second direction. The first light-emitting diode is for shining a first light-emitting area. The second light-emitting diode is for shining a second light-emitting area. An extension direction of the first light-emitting area intersects an extension direction of the second light-emitting area. A light-emitting area complementation effect is achieved, and a light mixing effect and a uniformity of light emission are further improved.

20 Claims, 7 Drawing Sheets

(56)　　　　　　　References Cited

FOREIGN PATENT DOCUMENTS

| | | | |
|---|---|---|---|
| CN | 109830501 | A | 5/2019 |
| CN | 111402723 | A | 7/2020 |
| CN | 114253029 | A | 3/2022 |
| CN | 216052535 | U * | 3/2022 |
| CN | 115327820 | A | 11/2022 |
| CN | 115513247 | A | 12/2022 |
| KR | 20160062546 | A | 6/2016 |

OTHER PUBLICATIONS

Written Opinion of the International Search Authority in International application No. PCT/CN2023/078885, mailed on Aug. 29, 2023.
Chinese Office Action issued in corresponding Chinese Patent Application No. 202211657431.6 dated Dec. 31, 2024, pp. 1-9.

* cited by examiner

BACKLIGHT PANEL

CROSS-REFERENCE TO RELATED APPLICATIONS

This application is a US national phase application based upon an International Application No. PCT/CN2023/078885, filed on Feb. 28, 2023, which claims priority to and the benefit of Chinese Patent Application No. 202211657431.6, filed on Dec. 22, 2022. The disclosures of which are incorporated herein by reference in their entireties.

TECHNICAL FIELD

The present disclosure relates to a field of display technology, and specifically relates to a backlight panel.

BACKGROUND

During a process of research and practice of existing technology, Inventors of the present disclosure have found that in micro light-emitting diode (LED) panels, micro LED devices are distributed in a same direction, so that a picture taste in a backlight state is poor, and there are bad tastes occurred easily, such as uneven picture display, light shadow, and the like.

SUMMARY

The embodiments of the present disclosure provide a backlight panel, which may improve a brightness uniformity.

The embodiments of the present disclosure provide a backlight panel, including:

a substrate; and a plurality of light-emitting diodes disposed on the substrate.

The plurality of light-emitting diodes include a first light-emitting diode for shining a first light-emitting area and a second light-emitting diode for shining a second light-emitting area, and an extension direction of the first light-emitting area intersects an extension direction of the second light-emitting area.

The backlight panel has a first direction and a second direction intersected with each other. The first light-emitting diode and the second light-emitting diode are alternately arranged along the first direction and/or the second direction. The first light-emitting area and the second light-emitting area are alternately arranged along the first direction and/or the second direction.

The first light-emitting area is partially overlapped with the second light-emitting area, and a pattern of the first light-emitting area and a pattern of the second light-emitting area are same.

Optionally, in some embodiments of the present disclosure, the first light-emitting diode and the second light-emitting diode are alternately arranged along the first direction and the second direction. The first light-emitting area and the second light-emitting area are alternately arranged along the first direction and the second direction.

The extension direction of the first light-emitting area is perpendicular to the extension direction of the second light-emitting area.

Optionally, in some embodiments of the present disclosure, a width of the first light-emitting area decreases from a middle area of the first light-emitting area toward an area of two ends of the first light-emitting area. A width of the second light-emitting area decreases from a middle area of the second light-emitting area toward an area of two ends of the second light-emitting area.

The middle area of the first light-emitting area is partially overlapped with the area of the two ends of the second light-emitting area; and/or, the middle area of the second light-emitting area is partially overlapped with the area of the two ends of the first light-emitting area.

Optionally, in some embodiments of the present disclosure, the second direction is perpendicular to the extension direction of the first light-emitting area, and the first direction is perpendicular to the extension direction of the second light-emitting area.

Optionally, in some embodiments of the present disclosure, the first light-emitting diode and the second light-emitting diode are alternately arranged along the first direction, and the first light-emitting area and the second light-emitting area are alternately arranged along the first direction.

Taking the first direction as a horizontal direction, the extension direction of the first light-emitting area, the first direction, and the extension direction of the second light-emitting area intersect in pairs.

Optionally, in some embodiments of the present disclosure, a width of the first light-emitting area decreases from a middle area of the first light-emitting area toward an area of two ends of the first light-emitting area. A width of the second light-emitting area decreases from a middle area of the second light-emitting area toward an area of two ends of the second light-emitting area.

In the first direction, the area of the two ends of the first light-emitting area is partially overlapped with the area of the two ends of the second light-emitting area.

Optionally, in some embodiments of the present disclosure, the first light-emitting diode and the second light-emitting diode are alternately arranged along the second direction, and the first light-emitting area and the second light-emitting area are alternately arranged along the second direction.

Taking the first direction as a horizontal direction, the extension direction of the first light-emitting area, the first direction, and the extension direction of the second light-emitting area intersect in pairs.

Optionally, in some embodiments of the present disclosure, a width of the first light-emitting area decreases from a middle area of the first light-emitting area toward an area of two ends of the first light-emitting area. A width of the second light-emitting area decreases from a middle area of the second light-emitting area toward an area of two ends of the second light-emitting area.

In the second direction, the area of the two ends of the first light-emitting area is partially overlapped with the area of the two ends of the second light-emitting area.

Optionally, in some embodiments of the present disclosure, there is a first included angle between the extension direction of the first light-emitting area and the first direction, there is a second included angle between the extension direction of the second light-emitting area and the first direction, the first included angle is greater than 30° and less than 60°; and the second included angle is greater than 120° and less than 150°.

The present disclosure further relates to another backlight panel, including:

a substrate; and a plurality of light-emitting diodes disposed on the substrate.

The plurality of light-emitting diodes include a first light-emitting diode for shining a first light-emitting area and a second light-emitting diode for shining a second light-emitting area, and an extension direction of the first light-emitting area intersects an extension direction of the second light-emitting area.

The backlight panel has a first direction and a second direction intersected with each other. The first light-emitting diode and the second light-emitting diode are alternately arranged along the first direction and/or the second direction. The first light-emitting area and the second light-emitting area are alternately arranged along the first direction and/or the second direction.

Optionally, in some embodiments of the present disclosure, the first light-emitting area is partially overlapped with the second light-emitting area.

Optionally, in some embodiments of the present disclosure, the first light-emitting diode and the second light-emitting diode are alternately arranged along the first direction and the second direction. The first light-emitting area and the second light-emitting area are alternately arranged along the first direction and the second direction.

The extension direction of the first light-emitting area is perpendicular to the extension direction of the second light-emitting area.

Optionally, in some embodiments of the present disclosure, a width of the first light-emitting area decreases from a middle area of the first light-emitting area toward an area of two ends of the first light-emitting area. A width of the second light-emitting area decreases from a middle area of the second light-emitting area toward an area of two ends of the second light-emitting area.

The middle area of the first light-emitting area is partially overlapped with the area of the two ends of the second light-emitting area; and/or, the middle area of the second light-emitting area is partially overlapped with the area of the two ends of the first light-emitting area.

Optionally, in some embodiments of the present disclosure, the second direction is perpendicular to the extension direction of the first light-emitting area, and the first direction is perpendicular to the extension direction of the second light-emitting area.

Optionally, in some embodiments of the present disclosure, the first light-emitting diode and the second light-emitting diode are alternately arranged along the first direction. The first light-emitting area and the second light-emitting area are alternately arranged along the first direction.

Taking the first direction as a horizontal direction, the extension direction of the first light-emitting area, the first direction, and the extension direction of the second light-emitting area intersect in pairs.

Optionally, in some embodiments of the present disclosure, a width of the first light-emitting area decreases from a middle area of the first light-emitting area toward an area of two ends of the first light-emitting area; a width of the second light-emitting area decreases from a middle area of the second light-emitting area toward an area of two ends of the second light-emitting area.

In the first direction, the area of the two ends of the first light-emitting area is partially overlapped with the area of the two ends of the second light-emitting area.

Optionally, in some embodiments of the present disclosure, the first light-emitting diode and the second light-emitting diode are alternately arranged along the second direction. The first light-emitting area and the second light-emitting area are alternately arranged along the second direction.

Taking the first direction as a horizontal direction, the extension direction of the first light-emitting area, the first direction, and the extension direction of the second light-emitting area intersect in pairs.

Optionally, in some embodiments of the present disclosure, a width of the first light-emitting area decreases from a middle area of the first light-emitting area toward an area of two ends of the first light-emitting area. A width of the second light-emitting area decreases from a middle area of the second light-emitting area toward an area of two ends of the second light-emitting area.

In the second direction, the area of the two ends of the first light-emitting area is partially overlapped with the area of the two ends of the second light-emitting area.

Optionally, in some embodiments of the present disclosure, there is a first included angle between the extension direction of the first light-emitting area and the first direction, there is a second included angle between the extension direction of the second light-emitting area and the first direction, the first included angle is greater than 30° and less than 60°, and the second included angle is greater than 120° and less than 150°.

Optionally, in some embodiments of the present disclosure, both a pattern of the first light-emitting area and a pattern of the second light-emitting area are selected from one of an elliptical shape, a double elliptical shape, or a bat shape.

Accordingly, the embodiments of the present disclosure further provide a backlight panel, including:

a substrate; and a plurality of light-emitting units disposed on the substrate.

The plurality of light-emitting units include at least three light-emitting diodes, center points of the at least three light-emitting diodes are arranged in a concentric circle each of the at least three light-emitting diodes has a light-emitting area, and an extension direction of the light-emitting area is a first extension direction.

Taking the concentric circle as a reference, the extension direction of a tangent line passing through the center points of the light-emitting diodes is a second extension direction, and an included angle between the first extension direction and the second extension direction ranges from −5° to 5°.

Optionally, in some embodiments of the present disclosure, in two adjacent light-emitting diodes, the light-emitting areas of the two adjacent light-emitting diodes are arranged axially symmetrically with the connecting line of the center points of the two light-emitting diodes.

Optionally, in some embodiments of the present disclosure, the center points of the light-emitting units in the light-emitting units are uniformly distributed on the concentric circle.

Optionally, in some embodiments of the present disclosure, the plurality of the light-emitting units are arranged in a matrix.

The backlight panel of the embodiments of the present disclosure includes the substrate and the plurality of light-emitting diodes disposed on the substrate. The plurality of light-emitting diodes include the first light-emitting diode for shining the first light-emitting area and the second light-emitting diode for shining the second light-emitting area. The extension direction of the first light-emitting area intersects the extension direction of the second light-emitting area.

The backlight panel has the first direction and the second direction intersected with each other. The first light-emitting diode and the second light-emitting diode are alternately arranged along the first direction and/or the second direction. The first light-emitting area and the second light-emitting area are also alternately arranged along the first direction and/or the second direction.

In the backlight panel of the embodiments of the present disclosure, the first light-emitting diode for shining the first light-emitting diode area and the second light-emitting diode for shining the second light-emitting diode area are alternately arranged along the first direction and/or the second direction. Since the extension direction of the first light-emitting area intersects the extension direction of the second light-emitting area, a complementation effect of the light-emitting area is achieved, and a light mixing effect and a uniformity of light emission are further improved.

DESCRIPTION OF DRAWINGS

To describe the technical solutions of the embodiments of the present disclosure more clearly, the following briefly introduces the accompanying drawings used in the description of the embodiments of the present disclosure. Apparently, the accompanying drawings described below illustrate merely some exemplary embodiments of the present disclosure, and persons skilled in the art may derive other drawings from the drawings without making creative efforts.

DETAILED DESCRIPTION OF EMBODIMENTS

Figure 1:
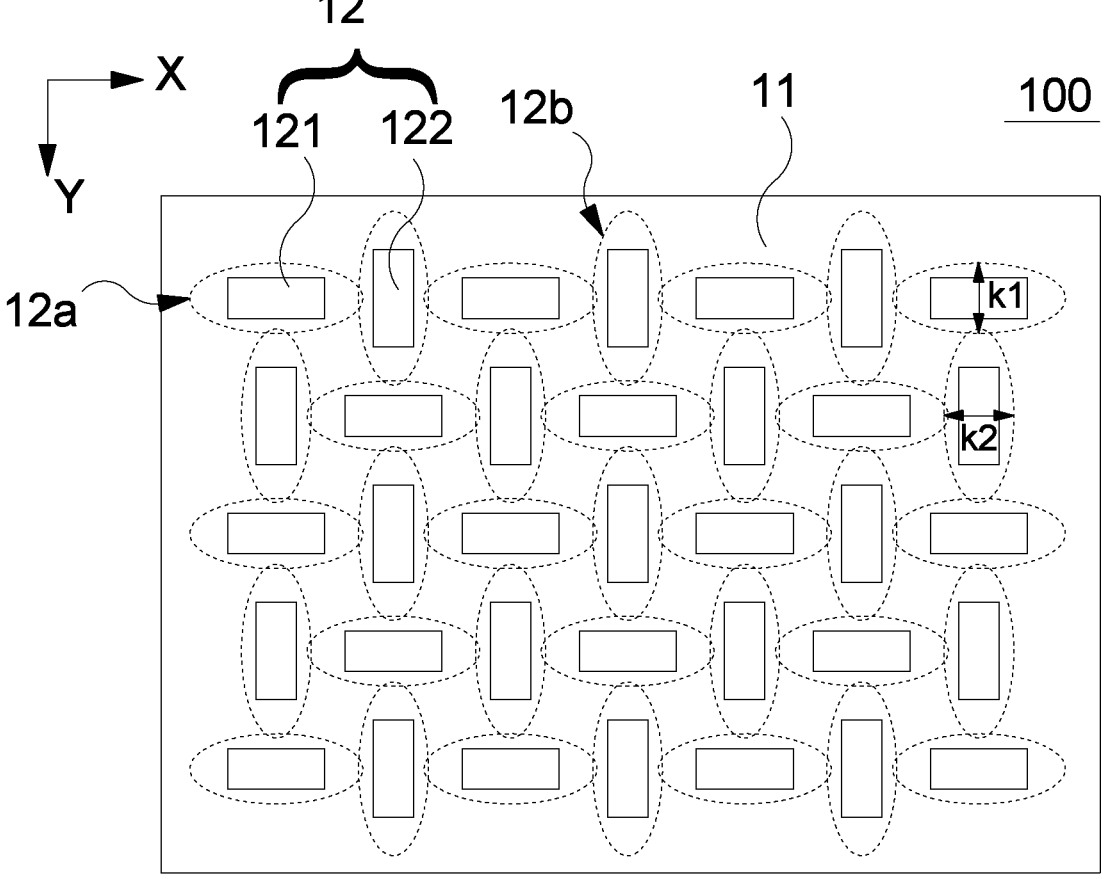
FIG. 1 is a structural schematic diagram of a backlight panel provided by a first embodiment of the present disclosure.

The technical solutions in the embodiments of the present disclosure will be described clearly and completely hereafter with reference to the accompanying drawings. Apparently, the described embodiments are only a part of but not all embodiments of the present disclosure. All other embodiments obtained by persons of ordinary skill in the art based on the embodiments of the present disclosure without creative efforts shall fall within the protection scope of the present disclosure. In addition, it should be understood that the specific embodiments described herein are merely used to illustrate and explain the present disclosure and are not used to limit the present disclosure. In the present disclosure, in the absence of a contrary description, the location words used, such as "up" and "down", usually refer to the up and down under the actual use or working state of the device, specifically the drawing direction in the attached drawings. The "inside" and "outside" are for the contour of the device.

The embodiments of the present disclosure provide a backlight panel, and details are described below. It should be noted that an order of the description of the following embodiments is not a limitation on a preferred order of the embodiments.

Embodiment 1

Referring to FIG. 1, the embodiment of the present disclosure provides a backlight panel 100. The backlight panel 100 includes a substrate 11 and a plurality of light-emitting diodes 12. The plurality of light-emitting diodes 12 are disposed on the substrate 11.

The plurality of light-emitting diodes 12 include a first light-emitting diode 121 and a second light-emitting diode 122. The first light-emitting diode 121 is for shining a first light-emitting area 12a, and the second light-emitting diode 122 is for shining a second light-emitting area 12b. An extension direction of the first light-emitting area 12a intersects an extension direction of the second light-emitting area 12b.

The backlight panel 100 has a first direction X and a second direction Y intersected with each other. The first light-emitting diode 121 and the second light-emitting diode 122 are alternately arranged along the first direction X and/or the second direction Y. The first light-emitting area 12a and the second light-emitting area 12b are also alternately arranged along the first direction X and/or the second direction Y.

In the backlight panel 100 of the embodiment of the present disclosure, the first light-emitting diode 121 having the first light-emitting area 12a and the second light-emitting diode 122 having the second light-emitting area 12b are alternately arranged along the first direction X and/or the second direction Y. Since the extension direction of the first light-emitting area 12a intersects the extension direction of the second light-emitting area 12b, a complementation effect of the light-emitting area is achieved, and a light mixing effect and a uniformity of light emission are further improved.

Optionally, the first light-emitting area 12a is partially overlapped with the second light-emitting area 12b. It may be understood that a pattern size of the light-emitting area is greater than a pattern size of the light-emitting diode. Therefore, the first light-emitting area 12a is partially overlapped with the second light-emitting area 12b, which may increase a brightness of an overlapping area. In addition, in the light-emitting area, a brightness in a middle area is larger, and a brightness in an edge area is smaller. Therefore, a way of the edge area overlapped is adopted to compensate for the brightness in the edge area and improve the uniformity of light emission of a whole surface.

Optionally, in this embodiment, the first light-emitting diode 121 and the second light-emitting diode 122 are alternately arranged along the first direction X and the second direction Y. The first light-emitting area 12a and the second light-emitting area 12b are further alternately arranged along the first direction X and the second direction Y.

The extension direction of the first light-emitting area 12a is perpendicular to the extension direction of the second light-emitting area 12b.

The layout uniformity of the whole surface may be improved by adopting a designed way that the extension direction of the first light-emitting area 12a is perpendicular to the extension direction of the second light-emitting area 12b.

Optionally, in this embodiment, a width k1 of the first light-emitting area 12a decreases from a middle area of the first light-emitting area 12a toward an area of two ends of the first light-emitting area 12a. A width k2 of the second light-emitting area 12b decreases from a middle area of the second light-emitting area 12b toward an area of two ends of the second light-emitting area 12b.

The middle area of the first light-emitting area 12a is partially overlapped with the area of the two ends of the second light-emitting area 12b. The middle area of the second light-emitting area 12b is partially overlapped with the area of the two ends of the first light-emitting area 12a.

In this embodiment, there is a partial overlap of the light-emitting area in both the first direction X and the second direction Y, thereby further improving the uniformity of light emission of the backlight panel 100.

Optionally, the second direction Y is perpendicular to the extension direction of the first light-emitting area 12a. The first direction X is perpendicular to the extension direction of the second light-emitting area 12b.

Since the first light-emitting area 12a and the second light-emitting area 12b are larger in the middle area and smaller in both sides, therefore, the uniformity of light emission may be further improved by adopting the perpendicular extension directions.

Figure 2:
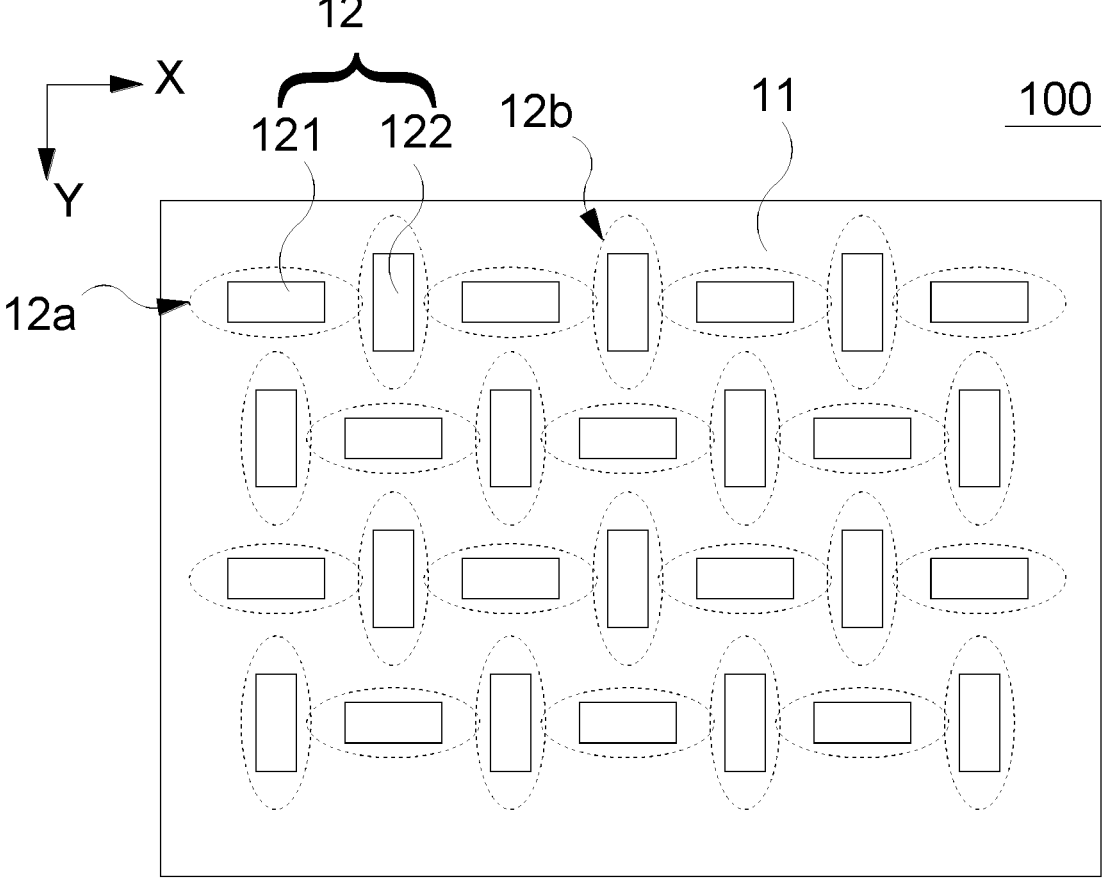
FIG. 2 is another structural schematic diagram of the backlight panel provided by the first embodiment of the present disclosure.

In some embodiments, for example, as shown in FIG. 2, the first light-emitting area 12a may merely be partially overlapped with the second light-emitting area 12b in the first direction X. That is, a distance from a center of the first light-emitting area 12a to a center of the second light-emitting area 12b in the first direction X, is less than a distance from the center of the first light-emitting area 12a to the center of the second light-emitting area 12b in the second direction Y.

Figure 3:
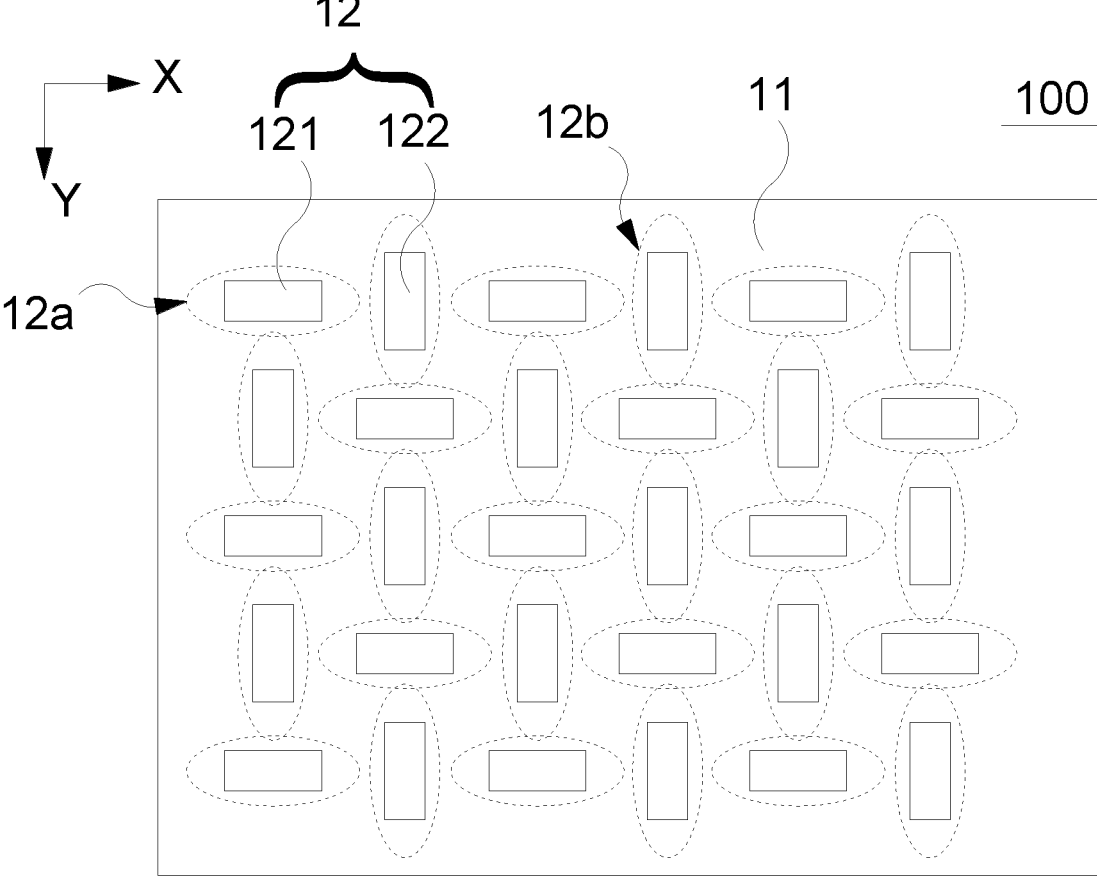
FIG. 3 is another structural schematic diagram of the backlight panel provided by the first embodiment of the present disclosure.

It may also be shown in FIG. 3, the first light-emitting area 12a may merely be partially overlapped with the second light-emitting area 12b in the second direction Y. That is, the distance from the center of the first light-emitting area 12a to the center of the second light-emitting area 12b in the second direction Y is less than the distance from the center of the first light-emitting area 12a to the center of the second light-emitting area 12b in the first direction X.

Optionally, a pattern of the first light-emitting area 12a and a pattern of the second light-emitting area 12b may be the same, and may also be different. When the pattern of the first light-emitting area 12a and the pattern of the second light-emitting area 12b are same, a same type of the light-emitting diodes may be used. That is, the same type of the light-emitting diodes may be arranged according to different directions, thereby not only reducing a difference of the light-emitting areas among different light-emitting diodes, but also saving cost.

Optionally, both the first light-emitting area 12a and the second light-emitting area 12b may are selected from one of an elliptical shape, a double elliptical shape, or a bat shape. The present disclosure does not limit the light-emitting areas of the first light-emitting diode 121 and the second light-emitting diode 122.

Embodiment 2

Figure 4:
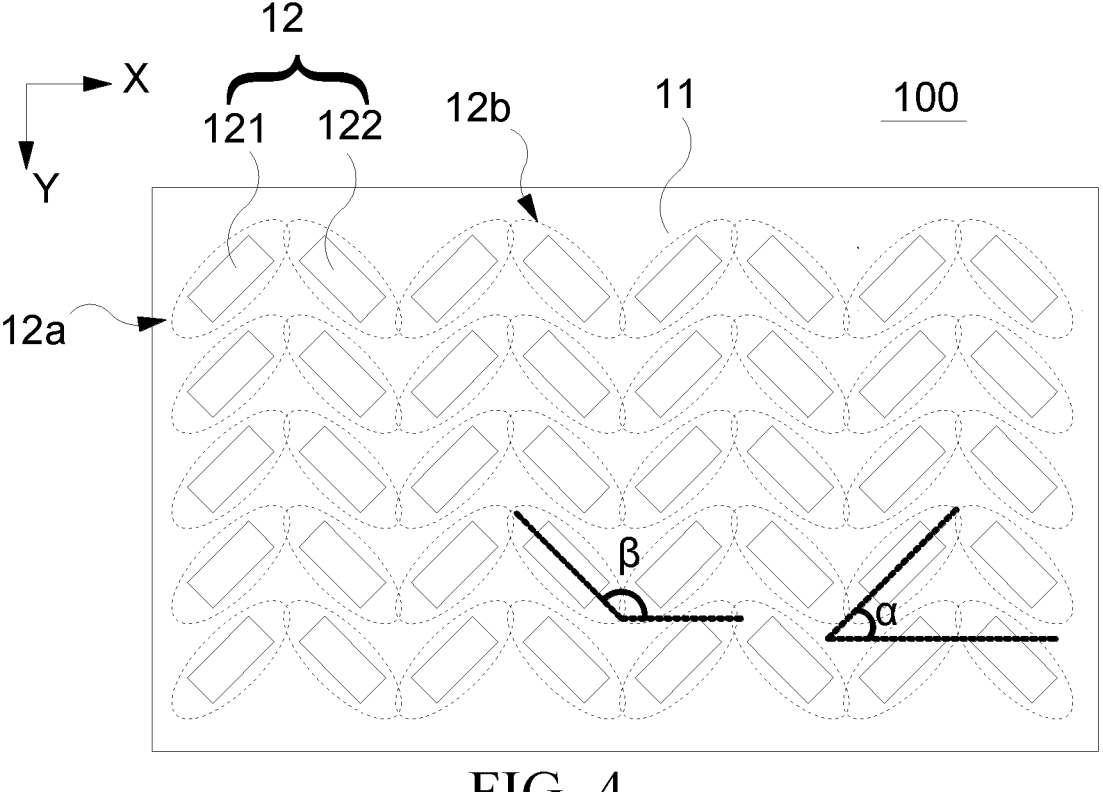
FIG. 4 is a structural schematic diagram of a backlight panel provided by a second embodiment of the present disclosure.

Optionally, as shown in FIG. 4, the first light-emitting diode 121 and the second light-emitting diode 122 are alternately arranged along the first direction X. The first light-emitting area 12a and the second light-emitting area 12b are further alternately arranged along the first direction X.

Optionally, the first light-emitting diode 121 is arranged in columns along the second direction Y. The second light-emitting diode 122 is also arranged in columns along the second direction Y. The first light-emitting diode 121 and the second light-emitting diode 122 are alternately arranged along the first direction X.

Taking the first direction X as a horizontal direction, the extension direction of the first light-emitting area 12a, the first direction X, and the extension direction of the second light-emitting area 12b intersect in pairs.

That is, the first light-emitting diode 121 and the second light-emitting diode 122 of this embodiment are arranged obliquely with respect to the first direction X. The first light-emitting diode 121 and the second light-emitting diode 122 are arranged obliquely, and the first light-emitting area 12a and the second light-emitting area 12b are also arranged obliquely. Compared with the Embodiment 1, this embodiment has a higher space utilization ratio, so that the light-emitting diodes may be laid out more uniformly.

Optionally, the width of the first light-emitting area 12a decreases from the middle area of the first light-emitting area 12a toward the area of two ends of the first light-emitting area 12a. The width of the second light-emitting area 12b decreases from the middle area of the second light-emitting area 12b toward the area of two ends of the second light-emitting area 12b.

In the first direction X, the area of the two ends of the first light-emitting area 12a is partially overlapped with the area of the two ends of the second light-emitting area 12b.

It may be understood that both the first light-emitting area 12a and the second light-emitting area 12b are larger in the middle area and smaller in two ends. Therefore, the brightness of the ends is improved to approach the brightness of the middle area by adopting a way of the overlapped ends, so as to achieve a uniform effect of the overall brightness.

In some embodiments, the end area of the first light-emitting area 12a may be not overlapped with the end area of the second light-emitting area 12b in the first direction X. That is, the end area of the first light-emitting area 12a and the end area of the second light-emitting area 12b are arranged at intervals, or, a boundary of the end area of the first light-emitting area 12 is contact with a boundary of the end area of the second light-emitting area 12b.

Optionally, there is a first included angle α between the extension direction of the first light-emitting area 12a and the first direction X. There is a second included angle β between the extension direction of the second light-emitting area 12b and the first direction X. The first included angle α ranges from 30° to 60°, and the second included angle β ranges from 120° to 150°.

That is, the first included angle α may be 30°, 45°, 60°, etc. The second included angle β may be 120°, 135°, 150°, etc.

It may be understood that when the first included angle α is 45° and the second included angle β is 135°, the layout of the light-emitting type of the whole light-emitting diodes is more uniform, thereby further improving the light-emitting uniformity.

Embodiment 3

Figure 5:
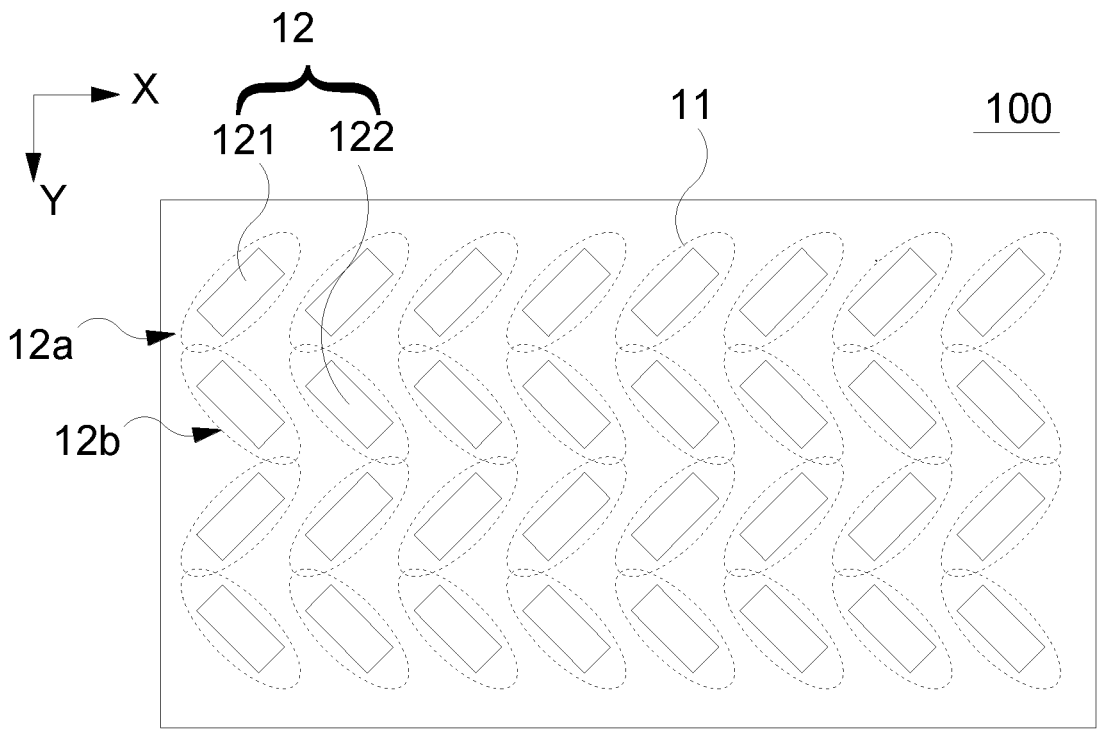
FIG. 5 is a structural schematic diagram of a backlight panel provided by a third embodiment of the present disclosure.

Optionally, as shown in FIG. 5, the first light-emitting diode 121 and the second light-emitting diode 122 are alternately arranged along the second direction Y. The first light-emitting area 12*a* and the second light-emitting area 12*b* are further alternately arranged along the second direction Y.

Optionally, the first light-emitting diode 121 is arranged in rows along the first direction X. The second light-emitting diode 122 is also arranged in rows along the first direction X. The first light-emitting diode 121 and the second light-emitting diode 122 are alternately arranged along the second direction Y.

Taking the first direction X as the horizontal direction, the extension direction of the first light-emitting area 12*a,* the first direction X, and the extension direction of the second light-emitting area 12*b* intersect in pairs.

That is, the first light-emitting diode 121 and the second light-emitting diode 122 of this embodiment are arranged obliquely with respect to the first direction X. The first light-emitting diode 121 and the second light-emitting diode 122 are arranged obliquely, and the first light-emitting area 12*a* and the second light-emitting area 12*b* are also arranged obliquely. Compared with the Embodiment 1, this embodiment has the higher space utilization ratio, so that the light-emitting diodes may be laid out more uniformly.

Optionally, the width of the first light-emitting area 12*a* decreases from the middle area of the first light-emitting area 12*a* toward the area of two ends of the first light-emitting area 12*a.* The width of the second light-emitting area 12*b* decreases from the middle area of the second light-emitting area 12*b* toward the area of two ends of the second light-emitting area 12*b.*

In the second direction Y, the area of the two ends of the first light-emitting area 12*a* is partially overlapped with the area of the two ends of the second light-emitting area 12*b.*

It may be understood that both the first light-emitting area 12*a* and the second light-emitting area 12*b* are larger in the middle area and smaller in two ends. Therefore, the brightness of the ends is improved to approach the brightness of the middle area by adopting the way of the overlapped ends, so as to achieve the uniform effect of the overall brightness.

In some embodiments, the end area of the first light-emitting area 12*a* may be not overlapped with the end area of the second light-emitting area 12*b* in the first direction X. That is, the end area of the first light-emitting area 12*a* and the end area of the second light-emitting area 12*b* are arranged at intervals, or, the boundary of the end area of the first light-emitting area 12 is contact with the boundary of the end area of the second light-emitting area 12*b.*

Optionally, there is the first included angle α between the extension direction of the first light-emitting area 12*a* and the first direction X. There is the second included angle β between the extension direction of the second light-emitting area 12*b* and the first direction X. The first included angle α ranges from 30° to 60°, and the second included angle β ranges from 120° to 150°.

That is, the first included angle α may be 30°, 45°, 60°, etc. The second included angle β may be 120°, 135°, 150°, etc.

It may be understood that when the first included angle α is 45°, and the second included angle β is 135°, the layout of the light-emitting type of the whole light-emitting diodes is more uniform, thereby further improving the light-emitting uniformity.

Embodiment 4

Figure 6:
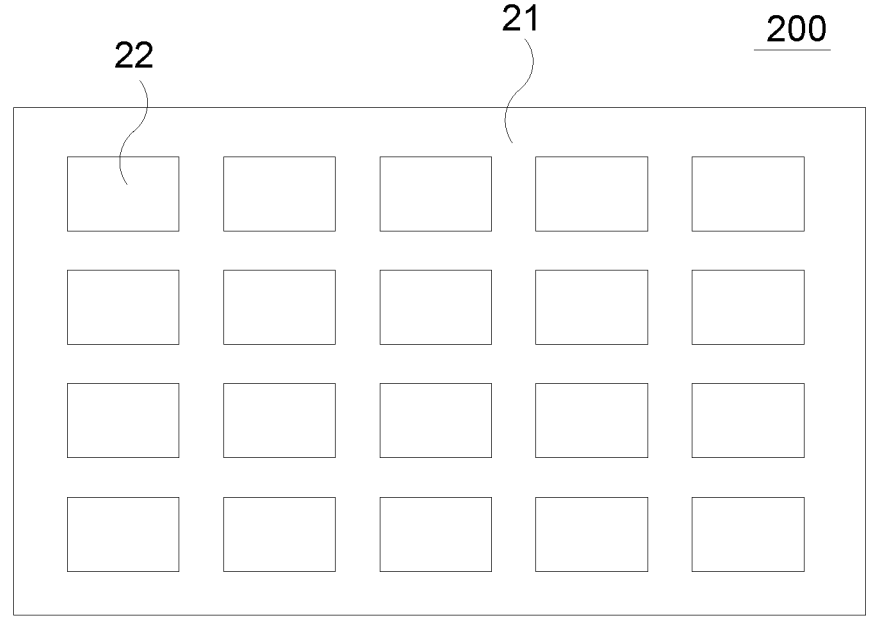
FIG. 6 is a structural schematic diagram of a backlight panel provided by a fourth embodiment of the present disclosure.
Figure 7:
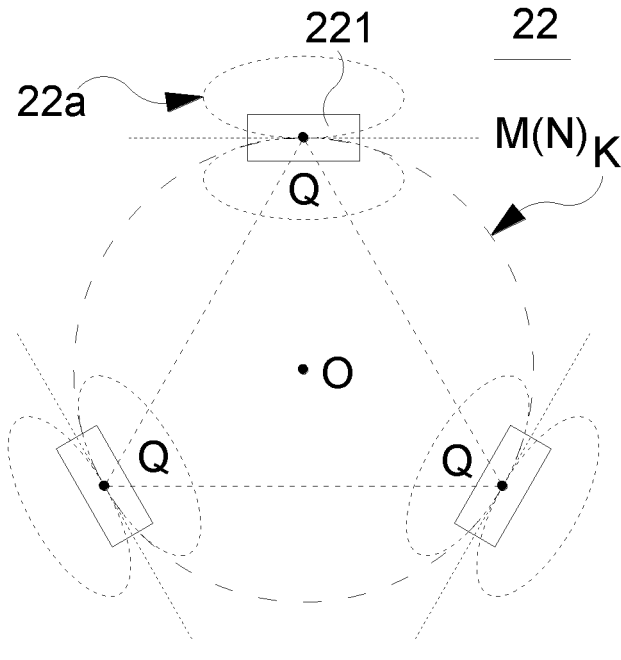
FIG. 7 is a first structural schematic diagram of a light-emitting unit of the backlight panel provided by the fourth embodiment of the present disclosure.

Accordingly, as shown in FIG. 6 and FIG. 7, the embodiment of the present disclosure further provides a backlight panel 200. The backlight panel 200 includes a substrate 21 and a plurality of light-emitting units 22. The plurality of light-emitting units 22 are disposed on the substrate 21.

The plurality of light-emitting units 22 include at least three light-emitting diodes 221. Center points Q of the at least three light-emitting diodes 221 are arranged in a concentric circle K. Each of the at least three light-emitting diodes 221 has a light-emitting area 22*a.* An extension direction of the light-emitting area 22*a* is a first extension direction M. A center of the concentric circle K is O.

Optionally, this embodiment is described as an example in which the light-emitting units 22 may include three light-emitting diodes 221 and a line connecting the center points Q of the three light-emitting diodes 221 forms an equilateral triangle.

Taking the concentric circle K as a reference, the extension direction of a tangent line N passing through the center points Q of the light-emitting diodes 221 is a second extension direction. An included angle between the first extension direction M and the second extension direction ranges from –5° to 5°.

Optionally, the included angle between the first extension direction M and the second extension direction may be –5°, 0°, or 5°. When the included angle between the first extension direction M and the second extension direction may be 0°, i.e., the first extension direction M and an extension direction of the tangent line N is the same, the uniformity of the light-emitting brightness of the light emitting unit 22 is better.

In this embodiment, the light-emitting diodes 221 are arranged in the concentric circle and a central angle of each of the center points Q is equal. That is, in the light-emitting units 22, the center points Q of the light-emitting diodes 221 are uniformly distributed on the concentric circle, so that the light emission of the light-emitting units 22 is more uniform.

Optionally, in two adjacent light-emitting diodes 221, the light-emitting areas 22*a* of the two adjacent light-emitting diodes 221 are arranged axially symmetrically with the connecting line of the center points Q of the two light-emitting diodes 221.

This arrangement improves the uniformity of the light emission of the light-emitting units 22.

Optionally, in this embodiment, the plurality of the light-emitting units 22 are arranged in a matrix.

Figure 8:
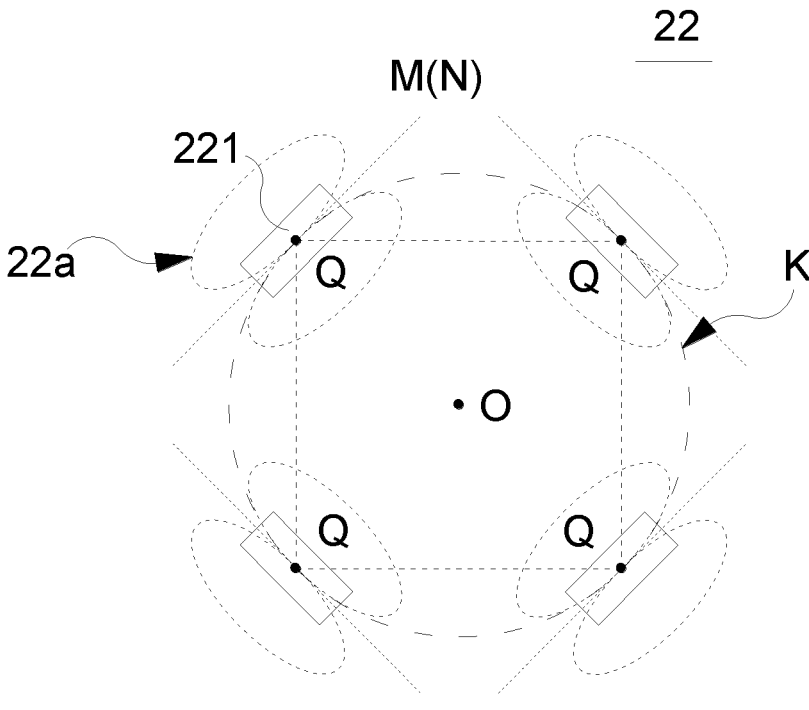
FIG. 8 is a second structural schematic diagram of the light-emitting unit of the backlight panel provided by the fourth embodiment of the present disclosure.

In some embodiments, the light-emitting units 22 may also include four light-emitting diodes 221. A line connecting the center points Q of the three light-emitting diodes 221 forms a square, as shown in FIG. 8.

Figure 9:
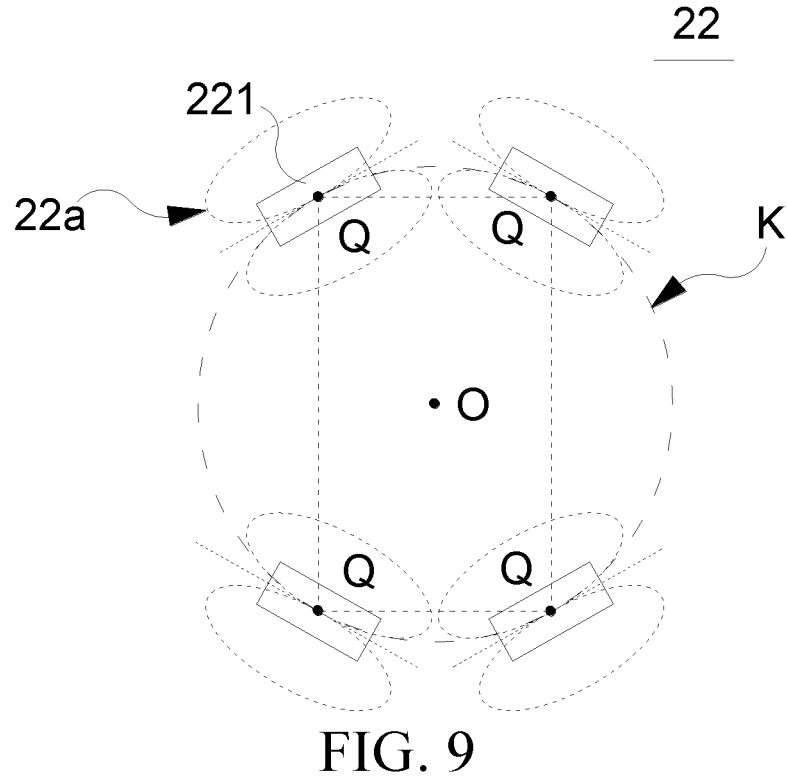
FIG. 9 is a third structural schematic diagram of the light-emitting unit of the backlight panel provided by the fourth embodiment of the present disclosure.

In some embodiments, the light-emitting units 22 include four light-emitting diodes 221. The line connecting the center points Q of the three light-emitting diodes 221 forms a rectangle, as shown in FIG. 9.

Figure 10:
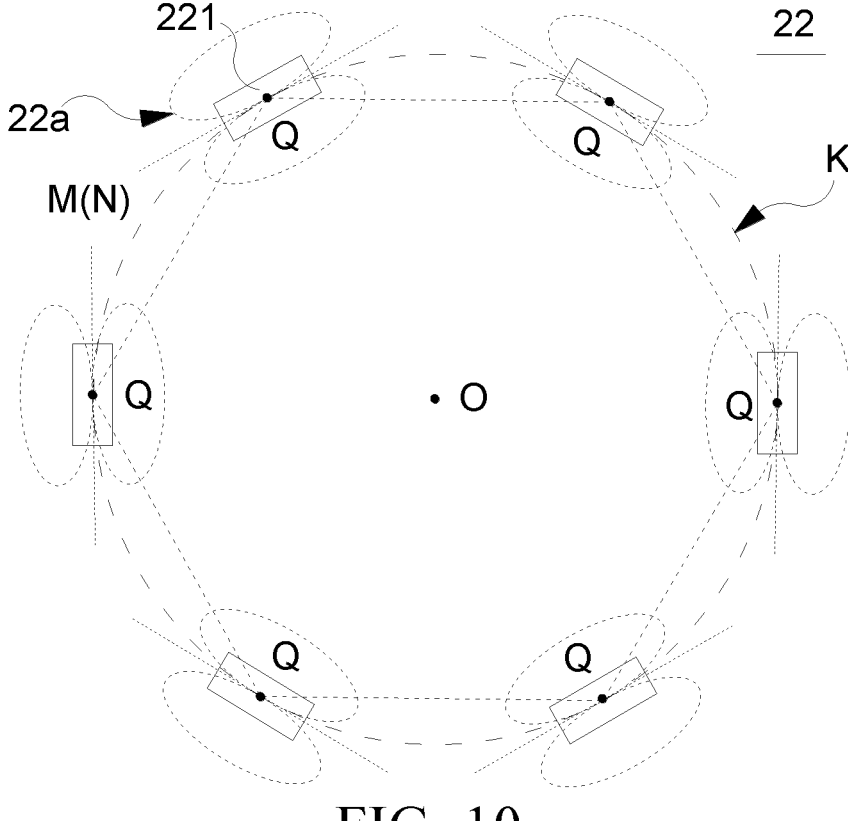
FIG. 10 is a second structural schematic diagram of the light-emitting unit of the backlight panel provided by the fourth embodiment of the present disclosure.

In some embodiments, the light-emitting units 22 include six light-emitting diodes 221. The line connecting the center points Q of the six light-emitting diodes 221 forms a regular hexagon, as shown in FIG. 10.

In the backlight panel 200 of the embodiment of the present disclosure, the light-emitting diodes 221 are arranged in a concentric circle, and the included angle between the first extension direction M and the second extension direction ranges from −5° to 5°, so that the light emission of the light-emitting units 22 is more uniform, thereby further improving the light mixing effect and the uniformity of the light emission of the backlight panel 200.

The backlight module provided by the embodiments of the present disclosure are described in detail above. The principle and implementations of the present disclosure are described in this specification by using specific examples. The description about the foregoing embodiments is merely provided to help understand the method and core ideas of the present disclosure. In addition, persons of ordinary skill in the art can make modifications in terms of the specific implementations and disclosure scopes according to the ideas of the present disclosure. Therefore, the content of this specification shall not be construed as a limit to the present disclosure.

What is claimed is:

1. A backlight panel, comprising:
a substrate; and
a plurality of light-emitting diodes disposed on the substrate;
wherein the plurality of light-emitting diodes comprise a first light-emitting diode for shining a first light-emitting area and a second light-emitting diode for shining a second light-emitting area, and an extension direction of the first light-emitting area intersects an extension direction of the second light-emitting area;
wherein the backlight panel has a first direction and a second direction intersected with each other, the first light-emitting diode and the second light-emitting diode are alternately arranged along the first direction and/or the second direction, and the first light-emitting area and the second light-emitting area are alternately arranged along the first direction and/or the second direction;
wherein the first light-emitting area is partially overlapped with the second light-emitting area, and a pattern of the first light-emitting area and a pattern of the second light-emitting area are same; and
wherein there is a first included angle between the extension direction of the first light-emitting area and the first direction, there is a second included angle between the extension direction of the second light-emitting area and the first direction, the first included angle ranges from 30° to 60°, and the second included angle ranges from 120° to 150°.

2. The backlight panel according to claim 1, wherein the first light-emitting diode and the second light-emitting diode are alternately arranged along the first direction and the second direction, and the first light-emitting area and the second light-emitting area are alternately arranged along the first direction and the second direction.

3. The backlight panel according to claim 2, wherein a width of the first light-emitting area decreases from a middle area of the first light-emitting area toward an area of two ends of the first light-emitting area, and a width of the second light-emitting area decreases from a middle area of the second light-emitting area toward an area of two ends of the second light-emitting area.

4. The backlight panel according to claim 1, wherein the first light-emitting diode and the second light-emitting diode are alternately arranged along the first direction, and the first light-emitting area and the second light-emitting area are alternately arranged along the first direction; and
wherein taking the first direction as a horizontal direction, the extension direction of the first light-emitting area, the first direction, and the extension direction of the second light-emitting area intersect in pairs.

5. The backlight panel according to claim 4, wherein a width of the first light-emitting area decreases from a middle area of the first light-emitting area toward an area of two ends of the first light-emitting area, and a width of the second light-emitting area decreases from a middle area of the second light-emitting area toward an area of two ends of the second light-emitting area; and
wherein in the first direction, the area of the two ends of the first light-emitting area is partially overlapped with the area of the two ends of the second light-emitting area.

6. The backlight panel according to claim 1, wherein the first light-emitting diode and the second light-emitting diode are alternately arranged along the second direction, and the first light-emitting area and the second light-emitting area are alternately arranged along the second direction; and
wherein taking the first direction as a horizontal direction, the extension direction of the first light-emitting area, the first direction, and the extension direction of the second light-emitting area intersect in pairs.

7. The backlight panel according to claim 6, wherein a width of the first light-emitting area decreases from a middle area of the first light-emitting area toward an area of two ends of the first light-emitting area, and a width of the second light-emitting area decreases from a middle area of the second light-emitting area toward an area of two ends of the second light-emitting area; and
wherein in the second direction, the area of the two ends of the first light-emitting area is partially overlapped with the area of the two ends of the second light-emitting area.

8. The backlight panel according to claim 1, wherein the extension direction of the first light-emitting area is perpendicular to the extension direction of the second light-emitting area.

9. The backlight panel according to claim 1, wherein a distance from a center of the first light-emitting area to a center of the second light-emitting area in the first direction is less than a distance from the center of the first light-emitting area to the center of the second light-emitting area in the second direction; or
the distance from the center of the first light-emitting area to the center of the second light-emitting area in the second direction is less than the distance from the center of the first light-emitting area to the center of the second light-emitting area in the first direction.

10. A backlight panel, comprising:
a substrate; and
a plurality of light-emitting diodes disposed on the substrate;
wherein the plurality of light-emitting diodes comprise a first light-emitting diode for shining a first light-emitting area and a second light-emitting diode for shining a second light-emitting area, and an extension direction of the first light-emitting area intersects an extension direction of the second light-emitting area;
wherein the backlight panel has a first direction and a second direction intersected with each other, the first light-emitting diode and the second light-emitting diode are alternately arranged along the first direction and/or the second direction, and the first light-emitting area and the second light-emitting area are alternately arranged along the first direction and/or the second direction; and wherein there is a first included angle between the extension direction of the first light-emitting area and the first direction, there is a second included angle between the extension direction of the second light-emitting area and the first direction, the first included angle ranges from 30° to 60°, and the second included angle ranges from 120° to 150°.

11. The backlight panel according to claim 10, wherein the first light-emitting area is partially overlapped with the second light-emitting area.

12. The backlight panel according to claim 10, wherein the first light-emitting diode and the second light-emitting diode are alternately arranged along the first direction and the second direction, and the first light-emitting area and the second light-emitting area are alternately arranged along the first direction and the second direction.

13. The backlight panel according to claim 12, wherein a width of the first light-emitting area decreases from a middle area of the first light-emitting area toward an area of two ends of the first light-emitting area, and a width of the second light-emitting area decreases from a middle area of the second light-emitting area toward an area of two ends of the second light-emitting area.

14. The backlight panel according to claim 10, wherein the first light-emitting diode and the second light-emitting diode are alternately arranged along the first direction, and the first light-emitting area and the second light-emitting area are alternately arranged along the first direction; and wherein taking the first direction as a horizontal direction, the extension direction of the first light-emitting area, the first direction, and the extension direction of the second light-emitting area intersect in pairs.

15. The backlight panel according to claim 14, wherein a width of the first light-emitting area decreases from a middle area of the first light-emitting area toward an area of two ends of the first light-emitting area, and a width of the second light-emitting area decreases from a middle area of the second light-emitting area toward an area of two ends of the second light-emitting area; and wherein in the first direction, the area of the two ends of the first light-emitting area is partially overlapped with the area of the two ends of the second light-emitting area.

16. The backlight panel according to claim 10, wherein the first light-emitting diode and the second light-emitting diode are alternately arranged along the second direction, and the first light-emitting area and the second light-emitting area are alternately arranged along the second direction; and wherein taking the first direction as a horizontal direction, the extension direction of the first light-emitting area, the first direction, and the extension direction of the second light-emitting area intersect in pairs.

17. The backlight panel according to claim 16, wherein a width of the first light-emitting area decreases from a middle area of the first light-emitting area toward an area of two ends of the first light-emitting area, and a width of the second light-emitting area decreases from a middle area of the second light-emitting area toward an area of two ends of the second light-emitting area; and wherein in the second direction, the area of the two ends of the first light-emitting area is partially overlapped with the area of the two ends of the second light-emitting area.

18. The backlight panel according to claim 10, wherein both a pattern of the first light-emitting area and a pattern of the second light-emitting area are selected from one of an elliptical shape, a double elliptical shape, or a bat shape.

19. The backlight panel according to claim 10, wherein the extension direction of the first light-emitting area is perpendicular to the extension direction of the second light-emitting area.

20. The backlight panel according to claim 10, wherein a distance from a center of the first light-emitting area to a center of the second light-emitting area in the first direction is less than a distance from the center of the first light-emitting area to the center of the second light-emitting area in the second direction; or the distance from the center of the first light-emitting area to the center of the second light-emitting area in the second direction is less than the distance from the center of the first light-emitting area to the center of the second light-emitting area in the first direction.

* * * * *